United States Patent
Sparacin et al.

(10) Patent No.: US 7,123,805 B2
(45) Date of Patent: Oct. 17, 2006

(54) MULTIPLE OXIDATION SMOOTHING METHOD FOR REDUCING SILICON WAVEGUIDE ROUGHNESS

(75) Inventors: Daniel K. Sparacin, Cambridge, MA (US); Kazumi Wada, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/869,636

(22) Filed: Jun. 16, 2004

(65) Prior Publication Data

US 2005/0013575 A1    Jan. 20, 2005

Related U.S. Application Data

(60) Provisional application No. 60/478,747, filed on Jun. 16, 2003.

(51) Int. Cl.
*G02B 6/10* (2006.01)
*H01L 21/00* (2006.01)

(52) U.S. Cl. ............. 385/130; 385/129; 385/131; 385/132; 438/29; 438/30; 438/31

(58) Field of Classification Search ........... 385/130; 398/29–31
See application file for complete search history.

(56) References Cited

U.S. PATENT DOCUMENTS 6,850,683 B1 * 2/2005 Lee et al. ............ 385/129

2002/0104822 A1 * 8/2002 Naydenkov et al. ...... 216/24
2003/0000919 A1 * 1/2003 Velebir, Jr. .............. 216/24

FOREIGN PATENT DOCUMENTS

WO    WO 02/063355    8/2002

OTHER PUBLICATIONS

"Thinning of Si in SOI Wafers by the SCI Standard Clean," Celler et al., *IEEE International SOI Conference* pp. 114-115 (Oct. 1999).
"Effect of size and roughness light transmission in a Si/SiO2 waveguide: Experiments and model," Lee et al. Applied Physics Letters. Sep. 2000. vol. 77, No. 11.

* cited by examiner

*Primary Examiner*—Brian Healy
*Assistant Examiner*—Charlie Peng
(74) *Attorney, Agent, or Firm*—Gauthier & Connors LLP

(57) ABSTRACT

The light-guiding structure includes a waveguide structure that comprises a substrate and a low refractive index underclad material. The waveguide structure is oxidized to form an oxidized layer on a surface of the waveguide structure. The oxidized layer is isotropically etched after the reaction-limited oxidation regime is approaching the diffusion-limited regime and repeatedly oxidized and etched so that the waveguide structure is continuously oxidized in the reaction-limited regime, reducing the overall time of oxidation and volume of oxidized material so that the waveguide structure has its sidewall roughness reduced efficiently enabling high transmission rates of guided light.

44 Claims, 2 Drawing Sheets

MULTIPLE OXIDATION SMOOTHING METHOD FOR REDUCING SILICON WAVEGUIDE ROUGHNESS

PRIORITY INFORMATION

This application claims priority from provisional application Ser. No. 60/478,747 filed Jun. 16, 2003, which is incorporated herein by reference in its entirety.

This invention was made with government support under Grant No. DMR-0213282 awarded by NSF. The government has certain rights in the invention.

BACKGROUND OF THE INVENTION

The invention relates to the field of optical communication, and in particular to high transmission waveguides and magnetooptical isolators having high Faraday rotation that can be integrated on Si and GaAs substrates.

Waveguides are typically made by deposition of the core material on a substrate of cladding material. Lithography is used to define the layout, of the waveguides, an etching step is used to pattern the waveguides, and finally a cladding is deposited on top. This typically leaves waveguides with minimal roughness on the top and bottom of the waveguide but substantial roughness on the sidewalls. There are currently two methods for reducing the roughness of silicon waveguides.

The first involves using an anisotropic etch which preferentially etches the surface to expose the slow etching {111} crystallographic planes. There are several detriments to choosing this smoothing technique. If the waveguide is crystalline, waveguides that direct light in different crystallographic directions will yield different cross-sectional shapes. This can affect polarization dependence, mode profile, and transmission of the waveguides. The final cross-sectional shape of the waveguide is usually trapezoidal or triangular depending on the original waveguide geometry. If the waveguide is polycrystalline, the effect of an anisotropic etch is unpredictable. Depending on the grain size, anisotropic etching can actually increase roughness. Not all aspects of anisotropic etching are detrimental though. Anisotropic etching has the possibility of smoothing a surface to near atomic smoothness (<4 A). The process is fast and requires no heat (the solution is often heated to 60–75 C to enhance reactivity): a plus if there is a tight thermal budget.

The second method for reducing silicon waveguide roughness is oxidation. Exposing the bare silicon waveguides to an oxygen rich environment promotes the growth of oxide. The high surface energy of the rough silicon surface is lowered by the oxidation as the crests of the roughness are etched fastest. The overall result is a smoothing effect as the oxidation occurs. There are several detriments with this method as well. First, typical silicon waveguide roughness requires several hours of high temperature oxidation to smooth the roughness to a level that allows for sufficient light transmission. This is dire for chip. designers who have tight thermal budgets and do not want diffusion to occur in other parts of the chip. Then again, the extent of cross-sectional shape alteration of the waveguides is not as drastic as in anisotropic etching. However, significant material is removed, and critical dimensional control is lost. Thus, oxidation smoothing is less sensitive to crystallographic direction, allowing for more freedom in photonic chip design.

The two methods described above have undesirable detriments. Thus, there is a need for a smoothing technique that allows for freedom in optical chip design, fits within thermal budgets, limits material loss and works with both poly and single crystal silicon.

SUMMARY OF THE INVENTION

According to one aspect of the invention, there is provided a method of reducing waveguide roughness. The method includes oxidizing the surface of a waveguide to form an oxidized layer. The method also includes isotropically etching the oxidized layer every time a reaction-limited regime is approaching a diffusion-limited regime. The oxidized layer is repeatedly oxidized and etched so that a waveguide is continuously oxidized in the reaction-limited regime, reducing the overall time of oxidation and volume of oxidized material so that the waveguide has its sidewall roughness reduced efficiently enabling high transmission rates of guided light.

According to another aspect of the invention, there is provided a light-guiding structure. The light-guiding structure includes a waveguide structure that comprises a substrate and a low refractive index underclad material. The waveguide structure is oxidized to form an oxidized layer on a surface of the waveguide structure. The oxidized layer is isotropically etched after the reaction-limited oxidation regime is approaching the diffusion-limited regime and repeatedly oxidized and etched so that the waveguide structure is continuously oxidized in the reaction-limited regime, reducing the overall time of oxidation and volume of oxidized material so that the waveguide structure has its sidewall roughness reduced efficiently enabling high transmission rates of guided light.

According to one aspect of the invention, there is provided a method of reducing waveguide roughness. The method includes forming a compound layer on a surface of a waveguide by exposure to a reactive ambient. The method also includes removing the compound layer every time a reaction-limited regime is approaching a diffusion-limited regime. The compound layer is repeatedly exposed and removed so that a waveguide is continuously exposed in the reaction-limited regime, reducing the overall time of exposure and volume of the compound layer materials so that the waveguide has its sidewall roughness reduced efficiently enabling high transmission rates of guided light.

According to another aspect of the invention, there is provided a light-guiding structure. The light-guiding structure includes a light-guiding structure comprising a waveguide structure that comprises a substrate and a low refractive index underclad material The waveguide structure is exposed to a reactive ambient to form an compound layer on a surface of said waveguide structure. The compound layer is removed after the reaction-limited regime is approaching the diffusion-limited regime and repeatedly exposed and removed so that the waveguide structure is continuously exposed in the reaction-limited regime, reducing the overall time of exposure and volume of the compound layer material so that said waveguide structure has its sidewall roughness reduced efficiently enabling high transmission rates of guided light.

DETAILED DESCRIPTION OF THE INVENTION

The invention is a novel processing method for reducing waveguide roughness in waveguides. While similar to oxidation smoothing, the inventive multiple oxidation smoothing method (MOSM) reduces oxidation time significantly by remaining in the fast, reaction-limited regime, rather than the slow, diffusion-limited regime.

Figure 1:
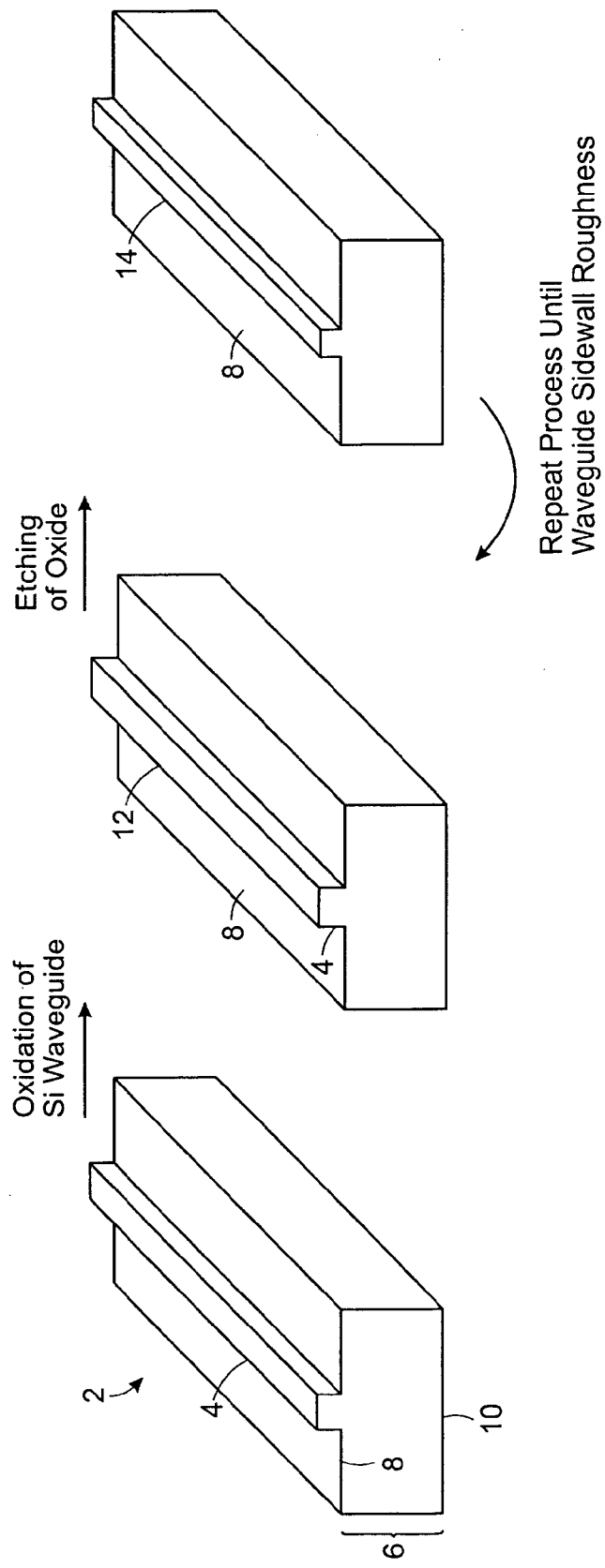
FIGS. 1A–1C are schematic diagrams illustrating the roughness reduction techniques used in the invention.

FIGS. 1A–1B illustrates the method steps taken to reduce waveguide roughness in accordance with the invention. FIG. 1A shows a Si waveguide 2 used in accordance with the invention. The Si waveguide 2 is formed by depositing a Si layer 4 on an oxidized Si wafer 6. The oxide layer 8 on a Si wafer 10 serves as the undercladding for the waveguide 2, which is comprised of low index material. The deposited top Si layer 4 is etched with a photolithography mask to define the waveguides. This leaves a waveguide with rough sidewalls on top of an oxide surface, which is above the Si wafer. The lower oxide cladding 8 is not touched by the MOSM process.

When a top Si layer 4 is exposed to an oxygen environment or a oxidizing chemical solution, oxidation occurs at a rate linear to time, that forms an oxide layer 12, as shown in FIG. 1B. The oxidation is simply governed by the rate of reactant to the surface 8, thus the term reaction-limited regime. However, as the oxidation continues, the oxide layer 12 becomes thicker and oxygen must diffuse through in order for the oxide layer 12 to continue growing. This results in a retardation of the oxidation rate, which is proportional to the square root of time and is known as the diffusion-limited regime. Since the reaction limited oxidation rate is more sensitive to radius of curvature (variations in surface flatness), the amount of material removed can be less than for oxidation in the diffusion limited regime. Thus, the sensitivity of the oxidation rate to variations in surface curvature is also muted. Note the invention can perform oxidation by gaseous ambients, wet ambients, or a mixture of both.

The undercladding oxide layer 8 is approximately 1 micron. The oxide layer 12 is approximately 25 nm or less, and is removed. Then whatever remains of the top Si layer 14 is further oxidized to produce another oxide layer of approximately 25 nm or less to further the smoothing process and then it is removed, as shown in FIG. 1C. Note this step can be repeated until a selective surface roughness of the top Si layer 14 is obtained.

By repeating the oxidize-etch-oxidize steps, the waveguide is continuously oxidized in the reaction-limited regime, reducing the overall time of oxidation, volume of oxidized material, and thus elevated temperature. For the case of using the oxidizing chemical solution, the waveguide is continuously oxidized in the reaction-limited regime, reducing the overall time of oxidation with no detrimental thermal effects. In essence, MOSM has the advantages of a single oxidation smoothing step and only some of the detriments.

Note the diffusion limited regime indicates that as oxygen approaches the silicon surface, its rate of forming an oxide is limited by the rate at which it can diffuse through the oxide to meet with the silicon surface. The reaction limited regime indicates that the Si+2O→SiO2 formation is the rate limiting step to producing oxide. Reaction-Limited is faster than Diffusion-Limited oxide formation.

Wet Etching is used to perform the etching that is selective to $SiO_2$ and not Si, such as in a HF solution. Etching can also be performed using other liquid solutions, such as SC-2 or the like. Moreover, etching can be performed using gaseous chemical solutions, such as anhydrous HF. Dry Oxidation is one possible method used to perform the oxidation step described herein which is typically done in a tube furnace, at 1050 C. Also, Dry oxidation prevents the introduction of Hydrogen into the Si waveguide. Si—H bonds can cause attenuation from material absorption in some of the telecom infrared light spectrum. However, dry oxidation in the reaction limited regime can occur at reasonable temperatures, even at room temperature. Special conditions such as rapid thermal annealing in ambients of prescribed oxygen composition can be used to precisely control the amount of oxidized material.

Figure 2:
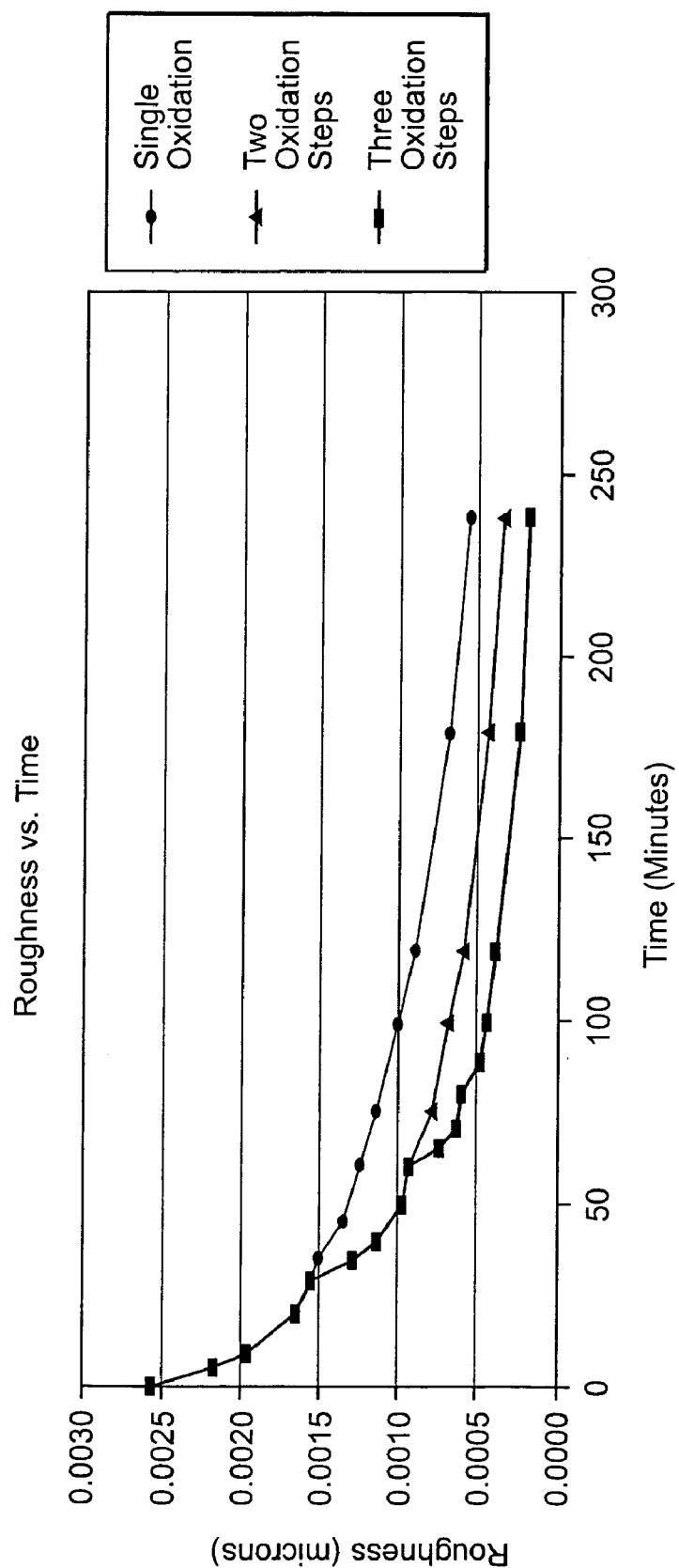
FIG. 2 is a graph illustrating the waveguide roughness amplitude versus oxidation time using either the one-step oxidation technique or the MOSM technique.

The use of an oxidizing chemical solution, such as standard clean one (SC-1), is another possible method used perform the oxidation step described herein. SC-1 is composed of Ammonium Hydroxide, Hydrogen Peroxide, and Water in a 1:1:5 ratio. The use of SC-1 involves placing the waveguide in the 80 C heated solution for 10 minutes which creates a thin oxide layer of approximately 8 nm or less. In other embodiments, other liquid oxidizing chemical solutions such as nitric acid can be used to create a thin oxide layer on silicon and HF (either in gaseous or liquid form) removes that layer. The oxide formation naturally terminates at the end of the reaction limited regime due to the low temperature. Also, piranha, sulfuric acid $H_2SO_4+H_2O_2$, 3:1, can also be used FIG. 2 is a graph illustrating the waveguide roughness amplitude versus oxidation time using either the one-step oxidation technique or the MOSM technique. In particular, FIGS. 1A and 1B show that the MOSM technique is an effective way of increasing the smoothing effect over the single step oxidation. The two examples of MOSM are the "Two Step Oxidation" with an etch step at 30 minutes and the "Three Step Oxidation" with etch steps at 30 and 60 minutes. Whereas the one-step oxidation transitions from a linear to a parabolic relation with time, MOSM remained virtually linear until the last etch. It should be noted that the MOSM results in FIGS. 1A and 1B is an initial try and not optimized to reach a certain roughness.

When optimized, MOSM can relieve thermal budgets by reducing the time at elevated temperature. For example, if one wished to use the same experimental conditions as in FIGS. 1A and 1B and wanted waveguides with a roughness equal to 0.5 nm, the choice would be clear. By using the "three step oxidation", the desired roughness value can be met with 90 minutes of high temperature oxidation, as opposed to 280 minutes for the "single step oxidation" or 170 minutes for the "two step oxidation". By the same token, MOSM can also relieve thermal budgets by working at lower temperatures. By maintaining the reaction-limited regime, a given roughness can be reduced at a significantly lower temperature for less process time, as a single step oxidation at elevated temperature would take.

A major advantage of MOSM over anisotropic etching includes the ability to smooth both polycrystalline and single crystal waveguides. Along the same lines, MOSM is less sensitive to crystallographic direction, enabling waveguide designers more freedom in optical chip design. MOSM fulfills the need for a smoothing technique that allows for freedom in optical chip design, fits within thermal budgets, and works with both poly and single crystal silicon.

In other embodiments, the invention is flexible enough to allow forming a compound layer on a surface of a waveguide by exposure to a reactive ambient, not just the use of oxidation. The compound layer is removed every time a reaction-limited regime is approaching a diffusion-limited regime. The compound layer is repeatedly exposed and removed so that a waveguide is continuously exposed in the reaction-limited regime, reducing the overall time of exposure and volume of the compound layer materials so that said waveguide has its sidewall roughness reduced efficiently enabling high transmission rates of guided light.

Although the present invention has been shown and described with respect to several preferred embodiments thereof, various changes, omissions and additions to the form and detail thereof, may be made therein, without departing from the spirit and scope of the invention.

What is claimed is:

1. A method of reducing waveguide roughness comprising:
   oxidizing the surface of a waveguide to form an oxidized layer, said oxidation is governed by the rate of reactant to the surface of said waveguide to define a reaction-limited regime once said oxidized layer grows and oxygen diffuses through said surface of said waveguide to define a diffusion-limited regime at an elevated temperature of at least 1050 C.; and
   isotropically etching the oxidized layer every time said reaction-limited regime is approaching said diffusion-limited regime; the oxidized layer is repeatedly oxidized and etched so that said waveguide is continuously oxidized in the reaction-limited regime isotropically etching comprises anhydrous HF, reducing the overall time of oxidation and volume of oxidized material so that said waveguide has its sidewall roughness reduced efficiently enabling high transmission rates of guided light.

2. The method of claim 1, wherein the waveguide has a substrate that comprises silicon.

3. The method of claim 1, wherein the oxidized layer is oxidized at least once.

4. The method of claim 3, wherein the oxidation is performed for approximately 90 minutes.

5. The method of claim 1, wherein the waveguide comprises a polycrystalline waveguide.

6. The method of claim 1, wherein the waveguide comprises a single crystal waveguide.

7. The method of claim 1, wherein said oxide layer is formed using an oxidizing chemical solution.

8. The method of claim 7, wherein said oxidizing chemical solution comprises standard clean one (SC-1).

9. The method of claim 7, wherein said oxidizing chemical solution comprises nitric acid.

10. The method of claim 1, wherein said isotropically etching comprises standard clean one (SC-2).

11. The method of claim 1, wherein said isotropically etching comprises liquid HF.

12. A light-guiding structure comprising a waveguide structure that comprises a substrate, and a low refractive index underclad material, said waveguide structure is oxidized to form an oxidized layer on a surface of said waveguide structure, said oxidation is governed by the rate of reactant to the surface of said waveguide structure to define a reaction-limited regime and a diffusion-limited regime is defined once said oxidized layer grows and oxygen diffuses through said surface of said waveguide structure at an elevated temperature of at least 1050 C., the oxidized layer is isotropically etched after the reaction-limited oxidation regime is approaching the diffusion-limited regime and repeatedly oxidized and etched so that the waveguide structure is continuously oxidized in the reaction-limited regime, reducing the overall time of oxidation and volume of oxidized material so that said waveguide structure has its sidewall roughness reduced efficiently enabling high transmission rates of guided light.

13. The light-guiding structure of claim 12, wherein the waveguide has a substrate that comprises silicon.

14. The light-guiding structure of claim 12, wherein the oxidized layer is oxidized twice.

15. The light-guiding structure of claim 14, wherein the oxidation is performed at 90 minutes.

16. The light-guiding structure of claim 12, wherein the waveguide comprises a polycrystalline waveguide.

17. The light-guiding structure of claim 12, wherein the waveguide comprises a single crystal waveguide.

18. The light-guiding structure of claim 12, wherein said oxide layer is formed using an oxidizing chemical solution.

19. The light-guiding structure of claim 12, wherein said oxidizing chemical solution comprises standard clean one (SC-1).

20. A method of reducing channel waveguide roughness comprising:
   forming a compound layer on a surface of a waveguide by exposure to a reactive ambient, said reactive ambient is governed by the rate of reactant to the surface of said waveguide to define a reaction-limited regime and a diffusion-limited regime is defined once said oxidized layer grows and oxygen diffuses through said surface of said waveguide surface at an elevated temperature of at least 1050 C; and
   removing the compound layer every time a reaction-limited regime is approaching a diffusion-limited regime utilizing diluted HF; the compound layer is repeatedly exposed and removed so that said waveguide is continuously exposed in the reaction-limited regime, reducing the overall time of exposure and volume of the compound layer materials so that said waveguide has its sidewall roughness reduced efficiently enabling high transmission rates of guided light.

21. The method of claim 20, wherein the said waveguide comprises a substrate.

22. The method of claim 20, wherein the compound layer is oxidized at least once.

23. The method of claim 22, wherein the oxidation is performed for approximately 90 minutes.

24. The method of claim 20, wherein the waveguide comprises a polycrystalline waveguide.

25. The method of claim 20, wherein the waveguide comprises a single crystal waveguide.

26. The method of claim 20, wherein said compound layer is formed using an oxidizing chemical solution.

27. The method of claim 26, wherein said oxidizing chemical solution comprises standard clean one (SC-1).

28. The method of claim 26, wherein said oxidizing chemical solution comprises nitric acid.

29. The method of claim 20, wherein said removing comprises anhydrous HF.

30. The method of claim 29, wherein said removing comprises standard clean one (SC-2).

31. The method of claim 29, wherein said removing comprises liquid HF.

32. The light-guiding structure of claim 21, wherein the substrate comprises silicon.

33. A light-guiding structure comprising a waveguide structure that comprises a substrate, a strip of material embedded within one or more materials, or residing on top of a plane of one or more materials, in which the majority of the optical power is contained within the strip and a low refractive index underclad material, said waveguide structure is exposed to a reactive ambient to form an compound layer on a surface of said waveguide structure, said reactive ambient is governed by the rate of reactant to the surface of said waveguide to define a reaction-limited regime and a diffusion-limited regime is defined once said oxidized layer grows and oxygen diffuses through said surface of said waveguide surface at an elevated temperature of at least 1050 C., the compound layer is removed after the reaction-limited regime is approaching the diffusion-limited regime utilizing diluted HF and repeatedly exposed and removed so that the waveguide structure is continuously exposed in the reaction-limited regime, reducing the overall time of exposure and volume of the compound layer material so that said waveguide structure has its sidewall roughness reduced efficiently enabling high transmission rates of guided light.

34. The light-guiding structure of claim 33, wherein the said substrate comprises a silicon.

35. The light-guiding structure of claim 33, wherein the compound layer is oxidized at least once.

36. The light-guiding structure of claim 35, wherein the oxidation is performed for approximately 90 minutes.

37. The light-guiding structure of claim 33, wherein the waveguide comprises a polycrystalline waveguide.

38. The light-guiding structure of claim 33, wherein the waveguide comprises a single crystal waveguide.

39. The light-guiding structure of claim 33, wherein said compound layer is formed using an oxidizing chemical solution.

40. The light-guiding structure of claim 39, wherein said oxidizing chemical solution comprises standard clean one (SC-1).

41. The light-guiding structure of claim 39, wherein said oxidizing chemical solution comprises nitric acid.

42. The light-guiding structure of claim 37, wherein said removing comprises anhydrous HF.

43. The light-guiding structure of claim 42, wherein said removing comprises standard clean one (SC-2).

44. The light-guiding structure of claim 42, wherein said removing comprises liquid HF.

* * * * *